(12) United States Patent
Votaw et al.

(10) Patent No.: US 10,747,858 B2
(45) Date of Patent: *Aug. 18, 2020

(54) DYNAMIC DIGITAL CONSENT

(71) Applicant: Bank of America Corporation, Charlotte, NC (US)

(72) Inventors: Elizabeth S. Votaw, Potomac, MD (US); David J. Smiddy, Chadds Ford, PA (US); F N U Sidharth, Charlotte, NC (US); Stephen T. Shannon, Charlotte, NC (US); James Alexander, Dripping Springs, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,426

(22) Filed: Sep. 16, 2019

(65) Prior Publication Data
US 2020/0012768 A1 Jan. 9, 2020

Related U.S. Application Data

(63) Continuation of application No. 15/663,810, filed on Jul. 30, 2017, now Pat. No. 10,417,401.

(51) Int. Cl.
*H04L 9/30* (2006.01)
*H04L 29/06* (2006.01)
*G06F 21/31* (2013.01)
*G06F 21/62* (2013.01)
*H04W 12/06* (2009.01)
(Continued)

(52) U.S. Cl.
CPC .......... *G06F 21/31* (2013.01); *G06F 21/6245* (2013.01); *G06Q 20/3224* (2013.01); *G06Q 20/4016* (2013.01); *H04L 63/0876* (2013.01); *H04L 63/101* (2013.01);
(Continued)

(58) Field of Classification Search
CPC ......... G06F 21/31; H04L 63/08; H04L 63/10; G06Q 20/4016
See application file for complete search history.

(56) References Cited

U.S. PATENT DOCUMENTS 6,105,007 A   8/2000   Norris
7,136,646 B1  11/2006  Bäck et al.
(Continued)

OTHER PUBLICATIONS

"Digital Onboarding with Consent to Use Customer Data," http://www.trunomi.com/solving-online-account-opening/, Apr. 30, 2015.
(Continued)

*Primary Examiner* — Wasika Nipa
(74) *Attorney, Agent, or Firm* — Weiss & Arons LLP; Michael A. Springs, Esq.

(57) ABSTRACT

Method and apparatus for a system to harden digital consents. The system uses an evaluation of geographic locations, transaction times, and device identities to control the upload of consent data. Evaluations occur using numerous techniques including MAC address evaluation, IP address evaluation, meta-data evaluation, and physical location of restricted equipment such as ATMs and kiosks. Reliability of consent data entered into the system may be enhanced by strictly evaluating geographic locations, transaction times, and/or device identities.

13 Claims, 6 Drawing Sheets

(51) Int. Cl.
*G06Q 20/40* (2012.01)
*G06Q 20/32* (2012.01)
*H04W 12/08* (2009.01)

(52) U.S. Cl.
CPC ........... *H04L 63/108* (2013.01); *H04W 12/06* (2013.01); *H04W 12/08* (2013.01); *G06F 2221/2111* (2013.01)

(56) References Cited

U.S. PATENT DOCUMENTS

| | | | |
|---|---|---|---|
| 7,308,412 B2* | 12/2007 | Rakshit | G06F 19/324 434/350 |
| 7,366,694 B2* | 4/2008 | Lazerson | G06Q 30/02 705/38 |
| 7,593,892 B2* | 9/2009 | Balk | G06Q 40/00 705/35 |
| 7,805,128 B2 | 9/2010 | Bentley et al. | |
| 8,191,776 B2 | 6/2012 | Ben-Zvi et al. | |
| 8,224,723 B2* | 7/2012 | Bosch | G06Q 20/108 705/35 |
| 8,738,527 B2 | 5/2014 | Kalinichenko et al. | |
| 9,014,666 B2 | 4/2015 | Bentley et al. | |
| 9,077,755 B2 | 7/2015 | Pacella et al. | |
| 9,712,520 B1 | 7/2017 | Canavor et al. | |
| 2003/0051144 A1* | 3/2003 | Williams | G06F 21/6209 713/178 |
| 2006/0095956 A1 | 5/2006 | Ashley et al. | |
| 2007/0244816 A1 | 10/2007 | Patni et al. | |
| 2008/0171573 A1 | 7/2008 | Eom et al. | |
| 2010/0011431 A1 | 1/2010 | Cynkin et al. | |
| 2011/0161076 A1 | 6/2011 | Davis et al. | |
| 2011/0287748 A1* | 11/2011 | Angel | H04M 3/42221 455/414.1 |
| 2012/0210011 A1 | 8/2012 | Liu et al. | |
| 2015/0082404 A1 | 3/2015 | Goldstein | |
| 2016/0005077 A1 | 1/2016 | McDevitt et al. | |

OTHER PUBLICATIONS

"GDPR, PSD2 & EPRIVACY: New Regulations Will Drive Financial Services Innovation," http://www.trunomi.com/gdpr-psd2-eprivacy-new-regulations-will-drive-financial-services-innovation/, Mar. 13, 2017.

* cited by examiner

DYNAMIC DIGITAL CONSENT

CROSS REFERENCE TO RELATED APPLICATION

This application is a continuation of U.S. patent application Ser. No. 15/663,810, filed on Jul. 30, 2017, which is hereby incorporated herein by reference in its entirety.

FIELD OF TECHNOLOGY

This disclosure relates to enhancing the performance of a computer system. Specifically, the disclosure relates to enhancing the performance establishing and storing customer consent information.

BACKGROUND OF THE DISCLOSURE

An entity may require a prospective client or existing client to receive, review and consent and/or otherwise agree to information and/or requirements included in specific official and/or authorized documents. The entity may require receipt of the consent and/or agreement prior to an entity representative entering into a communication interaction with the client.

Often, many entities use conventional methods to transmit and receive consent data to and from the clients. For example, an entity representative may hand a client a stack of documents. The client typically reviews the documents and verbally consents and/or agrees to the information and/or requirements included in the documents. The entity representative usually records, in a non-electronic manner, the client's consent and/or agreement to the information and/or requirements included in the documents.

One example of a transaction requiring consent is a financial instrument vendor speaking with a potential customer about purchase possibilities such as mortgages or investments. Due to government required regulations, before such conversations may occur, certain legal disclosures must be read to the potential customer. Similarly, due to non-solicitation laws, a follow up conversation with the customer may not occur unless the customer previously ordered such a consultation or provided consent to receive such a follow up conversation, from for example an investment specialist.

One example of a document requiring consent may be a HIPAA (Health Insurance Portability and Accountability Act) release document. Upon signing a HIPAA release document, the signer may authorize an entity to share and/or release specific personal information and/or documentation.

One example of a document requiring agreement may be a notice that a specific financial service is not Federal Deposit Insurance Corporation (FDIC) insured and may lose value. Upon signing the notice, the signer may make clear that he or she agrees to continue a discussion with a financial services advisor despite the fact that financial products offered may not be FDIC insured and may lose value.

The conventional non-integrated nature of consent information dispersal and retrieval creates the possibility that consent data may not be reliably captured either in writing or digitally. As a result, conventionally entities often repeatedly ask for the same consent information over and over again. Also, failure to properly present proof that the proper consent was obtained may result in audit or regulatory burdens or fines.

Therefore, systems and methods for securely receiving real-time, properly executed consent, and documenting, in a retrievable manner, the received executed consent may be desirable.

As a result, there is clear utility in and benefit from, novel methods and apparatus for retrieving consent information.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

For the purposes of this disclosure, like reference numerals in the figures shall refer to like features unless otherwise indicated. The drawings are only an exemplification of the principles of the invention and are not intended to limit the disclosure to the particular embodiments illustrated.

BRIEF SUMMARY

Figure 1:
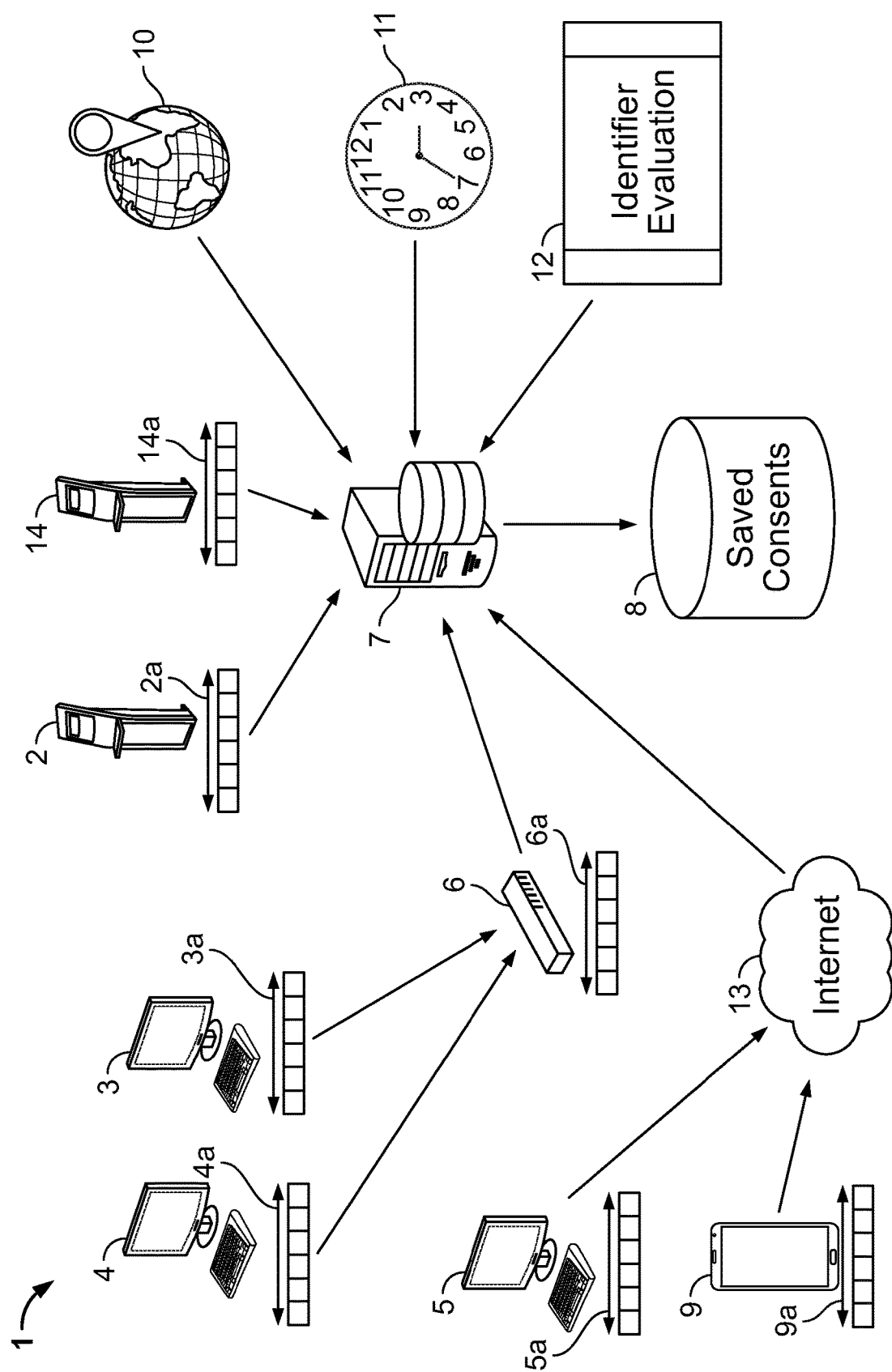
FIG. 1 is a first systems chart illustrating a first embodiment of the disclosure utilizing consent information.

To satisfy the long-felt but unsolved needs identified above, at least one embodiment is directed toward an apparatus and a method for an end-to-end consent acceptance process. The method and apparatus may comprise a computer system configured for the acceptance of consent information. The computer system may be configured to condition the acceptance of various consent information on respective specific identifiers including but not limited to geographic and chronological data.

The method may improve the performance of the computer system. The method may comprise the steps of reactivating, at a scheduled time, dormant system resources, creating and terminating an audio telecommunication linkage with a device, detecting transport of the device, transmitting a signal from the device, activating a consent scheme on the device, activating an authorization scheme, creating and uploading an item of consent data, and updating a list of the dormant system resources.

The dormant system resources may be reactivated at a scheduled time. The system resources may be required to execute, on a remote computer system, a plurality of system applications on a default list. The default list may identify a group of default system applications. The resources may comprise electricity, processing power, and auxiliary systems.

The telecommunication linkage may be terminated no less than a minute after its creation. The telecommunication linkage may be an audio telecommunication linkage between a device and the remote computer system when the device is located at a first geographic location.

During the telecommunication linkage, a second geographic location may be identified via audio transmission. The second geographic location may be different from the first geographic location.

The detection of transportation of the device to the second geographic location may occur after the termination of the telecommunication linkage.

A signal may be transmitted from the device at the second location. The signal may be transmitted to the remote computer system when the device is located at the second geographic location. The signal may comprise an identity of an item of consent data, a transaction identity, a device identity, an indicator that the device is located at the second geographic location, a time period, and the device user.

Based on the second location, the activated consent scheme on the device may comprise: retrieving a first list, the first list identifying a group of system applications associated with the identified item of consent data; deactivating active system resources of system applications absent from the first list; reactivating dormant system resources required to activate a first collection of dormant system applications of the first list, the first collection of system applications verifying that the device is in fact at the second geographic location and that the second geographic location matches a predetermined value associated with the identified item of consent data; reactivating dormant system resources required to activate a second collection of dormant system applications of the first list, the second collection of system applications verifying that the time period matches a predetermined value associated with the identified item of consent data; and reactivating dormant system resources required to activate a third collection of dormant system applications of the first list, the third collection of system applications verifying that the device identify matches a predetermined value associated with the identified item of consent data.

Based on the second location, the activated authorization scheme may comprise: retrieving a second list, the second list identifying a group of default system applications associated with both the transaction and the identified item of consent data; deactivating active system resources of system applications absent from the second list; activating dormant system resources of system applications present on the second list; utilizing data generated by the active system applications and the signal to generate and return an approval value.

When all of the second geographic location, time period, and device identity match their respective predetermined values, the remote computer system may change the operation of the device to optimize the preparation of the identified item of consent data. The change in operation may comprise: altering the luminosity of a screen on the device, altering the size of text characters displayed on the screen of the device, and terminating communication between the device and any computer system other than the remote computer system.

The identified item of consent data may be created and uploaded from the device to the remote computer system.

A default application in the list may be replaced with a non-default application when, over the course of a 30-day period, a default application is deactivated by the authorization scheme or consent scheme more times than a non-default application is activated by the authorization scheme or consent scheme.

The item of consent data may be one item selected from the group consisting of a digital document, an electronic signature, a scanned copy of a paper document, a scanned copy of a hand signature, a digital affirmation, a text bearing digital file, an audio recording of a conversation, a video recording of a conversation, and any combination thereof, and may comprise meta-data and an SHA Hash.

The authorization scheme may be activated before the consent scheme is activated.

The device's identity may be verified by comparing its MAC address to items selected from the group consisting of a list of approved MAC addresses, a list of disapproved MAC addresses, and any combination thereof.

The device's geographic location may be verified by comparing its MAC address to items selected from the group consisting of a list of approved MAC addresses, a list of disapproved MAC addresses, and any combination thereof.

The signal may be transmitted from the device via a multi layered network comprising multiple MAC addresses and the geographic location verified by comparing all the involved MAC addresses to items selected from the group consisting of a list of approved MAC addresses, a list of disapproved MAC addresses, and any combination thereof.

The device's geographic location may be verified by comparing its IP address to a geographic location associated with the IP addresses.

The device's geographic location may be verified by analyzing meta-data embedded within the signal or embedded within the item of consent data.

The device may be logged onto the remote computer system via an ISP server over the internet and the geographic location is verified by identifying MAC addresses IP addresses associated with the ISP server.

The device may be logged onto the remote computer system via an integrated component of the remote computer system and the geographic location is verified by identifying the known physical location of the integrated component.

The system applications may be executed software applications selected from the group consisting of: geography confirming software, time retrieval software, time stamping software, fingerprint recognition program, voice recognition program, iris recognition program, DNA recognition program, camera, facial recognition program, document recognition program, personal data confirmation, distributed database blockchain data confirmation, risk assessment program, behavior prediction program, bar code scanners, optical scanners, biomarker scanners, token identification scanner, magnetic scanner, card reader, heart rate reader, bloodoxygen reader, x-ray scanner, transponder reader, and any combination thereof.

The authorization scheme may comprise receiving a second signal from the device and the executed software compares data within the second signal to data on file within the remote computer system, at least one active system application generates an approval value that cannot be within the first predetermined threshold when the data within the second signal diverges from the data on file within the remote computer system by more than a predetermined amount.

The method may further comprise a blacklist. The blacklist may comprise a list of one or more of specific geographic locations, time periods, device identities, MAC addresses, IP addresses, and meta-data that will always generate an approval value than cannot be within the predetermined threshold.

The method may further comprise a whitelist. The whitelist may comprise a list of one or more of specific geographic locations, time periods, device identities, MAC addresses, IP addresses, and meta-data that will always generate an approval value than cannot be within the predetermined threshold.

The method may further comprise creating a timestamp associated with the consent data on the device, comparing the device consent data timestamp to all timestamps of all stored items of consent data within the remote computer system, and rejecting the upload of the item of consent data from the device if any timestamps of stored items of consent data within the remote computer system matches the device consent data timestamp.

The apparatus may comprise a data processing system. The data processing system may comprise a processor, a telecommunication device, and an output device.

The processor may be constructed and arranged to determine that a user device is within a pre-determined distance of a first geographic location of the user device within a pre-determined time period of receiving an input comprising a transaction identifier.

The telecommunication device may be constructed and arranged to establish a telecommunication linkage with the user device when the user device is within the pre-determined distance.

When the processor determines that the user device is within the pre-determined distance of a second geographic location, and the second geographic location is different from the first geographic location, the output device may be constructed and arranged to retrieve and transmit disclosure information associated with the transaction identifier to the user device after the telecommunication linkage has been established and subsequently terminated.

The output device may be constructed and arranged to transmit electronic copies of unexecuted contracts associated with the transaction identifier to the user device and/or to receive electronic copies of executed versions of the contracts from the user device when the determined geographic location of the user device is within the pre-determined distance of the second geographic location.

The processor may be further constructed and arranged to change the operation of the user device to optimize review of the disclosure information and execute contracts, the change in operation comprising: altering the luminosity of a screen on the user device, altering the size of text characters displayed on the screen of the user device, decrypting data received by the user device, and terminating communication between the user device and any other apparatus not a part of the data processing system.

The processor is further constructed and arranged to: log records associated with data sent and received by the output device, input-output device and telecommunication device; detect that the disclosure information and contract has been viewed on the user device; receive electronic confirmation that the user has agreed to the terms of the contract; and reverse the change in operation imposed on the user device such that the user device is restored to an operating state that existed prior to the change in operation.

The geographic location may be determined by comparing an attribute of data associated with the user device to locations known to be associated with the attribute of data, the attribute of data being one item selected from the group consisting of: the IP address of the user device, the IP network address of the user device, the IP host identifier of the user device, the IP regional address of the user device, the MAC address of the user device, the MAC address of a router connecting the user device to the system, meta-data embedded in the data input from the user device, a known location of the user device, and any combination thereof.

The user may access the data processing system via an item from the group consisting of a kiosk, personal computer, business computer, laptop computer, tablet device, networked computer, web browser, SMS device, SMS software, email device, email software, electronic data device, cell phone, computer terminal, PDA, and any combination thereof.

The apparatus may comprise a computer network. The network may comprise: a telecommunication device, an input-output device, a remote device, and a server.

The telecommunication device may be linked to the server and constructed and arranged to: establish a two-way audio connection with a remote device; and receive an identifier of a fixed geographic location via the audio communication, the fixed geographic location differing from the actual geographic location the remote device occupies during the audio connection.

The input-output device may be linked to the server and may be constructed and arranged to: transmit an electronic version of a contract in unexecuted form to the remote device; and receive an electronic version of a contract in executed form from the remote device and transfer it to the server.

The remote device may be constructed and arranged to: transmit an identification signal from a user to the input-output device before receiving an electronic version of a contract in unexecuted form to a remote device; receive the electronic version of the contract in unexecuted form; convert the electronic version of the contract into executed form; and transmit the electronic version of the contract in executed form to the input-output device.

The server may be constructed and arranged to: compare the meta-data of both the signal and the contract in executed form and the IP address and MAC address of the remote device to pre-established values associated with the fixed geographic location identifier, and store the contract in executed form when the meta-data, IP address, and MAC address correspond with the fixed geographic location identifier.

The server may be constructed and arranged to transmit the electronic version of the contract in unexecuted form to the remote device only when the meta-data of the signal and the IP address, and MAC address correspond with the fixed geographic location.

DETAILED DESCRIPTION OF THE DISCLOSURE

"Device" means any logic using electronic apparatus used to transmit user input and process, store, transmit, and/or output data, and includes but is not limited to, personal computers, business computers, laptop computers, tablet devices, computer networks, software applications, web browsers, SMS devices, SMS software, email devices, email software, electronic data devices, cell phones, cell phone applications, firmware, websites, cloud-based processing, internet routers, web servers, computer terminals, PDAs, any component thereof, any device integrated with any of the aforementioned, and any combination thereof.

"Consent Data" means specific information associated with making required disclosures to a client prior to or during a commercial transaction, conducting required consultations with a client prior to or during a commercial transaction, and/or executing required forms or contracts with a client prior to or during a commercial transaction, and the executed forms or contracts are a prerequisite for completing the commercial transaction but their execution do not themselves complete the transaction. The specific information may be one or more electronic documents, the text of the disclosure itself, the original or copies of the executed forms or contracts, the text, transcripts, or substance of the consultations, as well as records and archives indicating when and how the disclosure, consultation, forms, and/or contracts were supplied, performed, and or executed.

With the advent of electronic commerce, the need to efficiently manage consent data has come to fore. Often while various transactions are applied for, such as opening a deposit or credit card account, various consents must be provided. For example, certain legal disclosures may be required to be provided to a customer. Similarly, due to non-solicitation laws, certain services may not be provided unless the customer previously consented to receive access to the service.

In an embodiment, a system generates, stores, and retrieves consent data. The consent data may include records confirming that a required presentation of documents, text, or information was made to a customer. This may include files containing images of or the actual text of contract terms (such as shrink wrap contracts, terms or conditions) or images of or the actual text of provided legal disclosures such as identifying parties in fact, laws (such as the truth in lending act or HIPAA—Health Insurance Portability and Accountability Act of 1996 disclosure rules), or other information. The consent data may also be an image of or a record of an affirmation by the customer that they have read the supplied information. The affirmation may be a signed document, and an audio or video file of a recording of a statement of verbal consent. In an embodiment, the consent data is associated with digital identifiers linked to a specific customer. These identifiers include but are not limited to one or more validations of unique biometric identifiers.

In an embodiment, efficient and reliable access to stored consent data is provided. When dealing with transactions requiring consent information, the consumer must have received the specific disclosures, and they must provide an explicit consent to proceed which references that the required disclosure has taken place. Either or both of the consumer and the entity they are transacting with, must also be able to record that such consent was provided by the consumer. The requirements may arise from statutory law, regulatory law, insurance liability, or internal company policy. In some cases (such as with HIPAA controlled transactions) a first instrument must be executed before the process can begin (to obtain records) and a second instrument must also be executed for completion of the transaction.

In some circumstances, the disclosure must include consultation with a person having specific credentials (including but not limited to one or more people such as a doctor, accountant, attorney, CPA (certified public accountant), corporate officer, notary public, guardian ad litem, financial fiduciary, medical advocate, . . . etc., and any combination thereof). In some circumstances records of the consent must be filed with third parties such as government registries, regulatory agencies, insurers, and the like.

In at least one embodiment, the consent data comprises creation and/or updating of consultation records. Consultation records are proof that the consultation in fact occurred, it includes but is not limited to at least one of: an audio recording of at least a portion of the consultation, a video recording of at least a portion of the consultation, a record of biometric confirmation of the identity of the customer, a record of the customers presence in a fixed location at a specific time, a record of the license category and license serial number of the credentialed consultant, establishing a VOIP (voice over internet protocol) or other telecommunication link between a device at the location of a credentialed consultant and a device at the location of a customer, meta-data created by the consultation, and any combination thereof.

In at least one embodiment, the system includes a consent scheme. The consent scheme may include either or both of elements for obtaining and generating particular consent data, and elements for retrieving previously provided consent data. The consent data may be retrieved and/or generated before and/or after an authorization process for a transaction has occurred. The authorization process confirms at least one of a number of items specifically, that the consent is for the correct customer, that the transaction requiring the consent data is one that the customer may enter into, and that the customer has in fact chosen to enter into it. In one embodiment, the consent scheme may not commence until the prerequisite authorization scheme has been completed. In one embodiment, the authorization scheme may not commence until the prerequisite consent scheme has been completed.

The consent information may be required as a prerequisite to finalizing an offer to a customer to enter into a transaction. The offer may be a product. The offer may be for a service. The offer may be a product and/or a service. The product/service may be offered by a business, a governmental body, an educational institution, a financial institution, a regulatory agency, or any other suitable organization or vendor.

Examples transactions suitable for use in this disclosure include but are not limited to one item selected from the group consisting of accepting a loan, rejecting a loan, transferring funds, receiving funds, transferring a property title, receiving a property title, rejecting a title change, rejecting receipt of funds, making a payment, creating an escrow, withdrawing funds from an escrow, transferring funds out from an escrow, associating another user with the account, disassociating another from with the account, executing a contract, recording a document within a registry (such as a deed in a recorder of deeds or a car title in a department of motor vehicles), entering a comment to be associated with the account, and any combination thereof. Different transaction types may have different consent requirements.

FIG. 1 illustrates a system 1 for storing and retrieving consent data. The system 1 comprises numerous devices configured for inputting consent data. They include transaction specific devices (such as dedicated terminals, ATMs (automated teller machines), ATAs (automated teller assisting devices), kiosks, vending machines, and the like, and are collectively referred herein as "kiosks" 2, 14), data entry devices (such as computers 3, 4) and remotely accessed devices (such as a computer 5 or a cell phone 9). All putative consent data is input into a processing device (such as server or processor 7) which uses evaluation applications 10, 11, 12 to affirm or reject the input consent data. Once affirmed, the consent data is stored 8 for later retrieval.

In an embodiment, a user operating a data input device initiates a request to input consent data. In an embodiment, the system instigates the request for the user to input consent data. In an embodiment, the request to input data arises as a result of some other transaction occurring between an entity and the user.

Because of the highly sensitive or strict legal requirements of supplying and protecting consent data, at least two objectives come into play regarding obtaining consent information. The first objective is that the input data be of high reliability when received. The second objective is that the input data be reliably retrievable when needed for confirmation. Reliability when received means that the consent data accurately reflects that the customer truly understands the substance, consequence, and nature of what the consent data asserts that the customer is consenting to. Reliability when retrieved means that when previously stored consent data is utilized for a later transaction, the consent data is accurate, timely, valid, and otherwise suitable for whatever transaction is being contemplated between the entity and the customer.

One effective manner of accomplishing both objectives is by requiring the presence of targeted identifiers when inputting the data. Examples of suitable targeted identifiers include but are not limited to geo-fencing of data, chronological fencing of data, device fencing of data, and any combination thereof.

In at least one embodiment, geo-fencing is used as an identifier of the data. In geo-fencing, the consent data is not accepted by the system unless the data is input from an acceptable geographic location. For example, the data may need to be input from a computer device 3, 4, 5 physically located within a known given location such as a brick and mortar office of an entity. In the alternative, the geographic location may be one where it is known that only kiosks 2, 3 are located or the specific office computers 3, 4, 5 of credentialed professionals of the entity. The location may be determined either with knowledge of the actual physical location of the devices (for example installing a difficult to move kiosk at a site) and/or by validation with one or more geographic location technologies including but not limited to those described below.

In an embodiment, an entity requires multiple different forms of consent data and each requires a different geographic indicator. For example, the consent data required for a specific transaction includes a disclosure of information regarding a credit report, an executed form authorizing a credit report, a disclosure of information regarding a real property title search, and an executed power of attorney. A customer may need to input the consent data for the credit report into the computer 3 of the underwriting department, input the consent data for the title search into the computer 4 of the real estate department, and input the executed power of attorney into the computer 3 of the legal department. These different computers for generating different types of consent data may be within the offices of a common entity, may be in different branches or campuses, or may be in offices of different entities who must all collaborate before the transaction can be completed.

In an embodiment, a transaction requires multiple forms of consent data, some of which may be generated at any computer 3, 4, 5, at a given facility (such as a single or multiple branch offices of an entity) but others must be generated at a specific kind of kiosk 2, 3 or even at a single kiosk 2 at a single specific geographic location.

In an embodiment, a transaction requires multiple forms of consent data, some of which may be generated with a device remote from the entity's offices such as a computer 5 or cell phone 9 accessing the system via the internet 13, while others must be input into either one or more specific kinds of kiosks 2, 3 within a fixed geographic location and/or one or more computers 3, 4, 5 within a fixed geographic location (such as a campus, head office, and/or branch office.

In an embodiment, the system executes one or more applications 10 for determining if the correct geographic location is associated with the input consent data. The application may involve determining which specific kind of consent data was input, at which specific geographic location was the consent data input, and was the geographic location acceptable for the specific kind of input consent data. If the application 10 affirms that the geographic location was suitable for the kind of input consent data then a record of the customer's consent is saved 8 for later retrieval as appropriate.

In an embodiment, if the application 10 results in a determination that the geographic location was unsuitable for the specific kind of input consent data, a message may be sent to a user device indicating that the consent could not be accepted and providing a location and/or directions to a suitable location to input the consent. A geographic location may be unsuitable for any number of reasons including but not limited to the location being in a blacklist, the customer is known not to have been in that location, the location is known to be a source of unreliable information, the customer or entity have standing instructions only to accept consent data from a whitelist of locations, there is inconsistencies between two or more methods being used to determine the location, and any combination thereof. The device the message is sent to may be other than or in addition to the device used to attempt to enter the consent data such as an SMS, email, VOIP, or other service, server, computer, cell phone, or other device associated with a customer of the entity.

In an embodiment, the system executes one or more applications 12 for determining if the correct device is associated with the input consent data. A device may be "correct" for reasons including but not limited to the need for specific tokens, firmware, software, and/or hardware only installed on specific devices, a requirement that all consent data be generated by common or identical devices, not being among a pre-established blacklist of incorrect devices, is among a pre-established whitelist of correct devices, the device is known not to have been stolen or is otherwise unreliable, and any combination thereof. The application may involve determining which specific kind of consent data was input, with which specific device or with which category of device was the consent data input, and was the device identity acceptable for the specific kind of input consent data. If the application 12 affirms that the device identity was suitable for the kind of input consent data then a record of the consent data is saved 8 for later retrieval as appropriate.

The device may be identifiable due to unique properties of the device, due to software or tokens installed on a specific device, or due to use some or all of industry protocols such as MAC (media access control) addresses. A MAC address is a unique identifier assigned to a specific piece of hardware which effects a data communication between a specific computer and a greater network.

Typically, the specific hardware bearing the MAC addresses is a network interface controller (NIC) which often includes but is not limited to network interface cards, network adapters, LAN adapters, physical network interfaces, and any combination thereof. The MAC address is often stored in the device in a firmware mechanism such as read-only memory. When assigned by the manufacturer, a MAC address usually encodes the manufacturer's registered identification number and may be referred to as the burned-in address (BIA). It may also be known as an Ethernet hardware address (EHA), hardware address or physical address. In contrast to other addresses used in networking schemes such as programmed address, a MAC address remains fixed over time and is not arbitrary.

As illustrated in FIG. 1, the MAC address 2a, 3a, 4a, 5a, 6a, 9a, 14a for each respective device 2, 3, 4, 5, 6, 9, 14 comprises 6 8-bit octets. The first 3 octets are usually unique to the organization that manufactured the device and are often referred to as an Organizationally Unique Identifier (OUI). The remaining three octets are usually assigned by the manufacturer according to internal reasons and prerogatives.

In an embodiment, the system may include one or more network layers in which individual devices 3, 4, 5, are commonly linked through hardware such as a router 6. Hardware in each network layer (such as a router 6) will also have a respective MAC address 6a. In an embodiment, the consent data is input into a device within a multi-layer network and an evaluation application 12 evaluates if one, some, all, and any combination thereof of the MAC addresses (or any portion of the MAC addresses) within that network match the geographic evaluation scheme.

In an embodiment, a list is maintained of acceptable MAC addresses known to be located in a specific geography, and a geographic evaluation application 10 uses the MAC address as a proxy for the geographic location. As a result, MAC address can be used to approve consents for devices both in unknown remote geographies such as the MAC address 5a of a computer 5 or the MAC address 9a of a cell phone 9 accessing the system via the internet 13 as well as in known geographic location such as a specific building or branch office.

In an embodiment, the details of how the input device logs into the device 7, including but not limited to any detail involved in an internet connection and/or the IP address, are used as a proxy for either a geographic identifier or a device identifier used by an application 10, 12 to affirm if the input consent data may be accepted. The application 10, 12 may involve determining which specific kind of consent data was input, with which specific login was the consent data input, and was the login identity acceptable for the specific kind of input consent data. If the application 10, 12 affirms that the login identity was suitable for the kind of input consent data then a record of the consent data is saved 8 for later retrieval as appropriate.

In an embodiment, a geographic location suitable for one form of consent data is unsuitable for another form of consent data. For example, if the consent data is a record indicating that a meeting took place between a specific consultant and a customer, the application 10, 12 may require that the consent data have a geography matching the physical office address of the specific consultant. In contrast, if the consent data was a confirmation that a customer has finished reading through documents provided after the consultation has ended, the application 10, 12 may require that the consent data have a geography matching the home address of the customer.

In an embodiment, the geographic identifier may be as coarse (wide ranging) as a specific continent, ocean, country, province, town, city, or neighborhood, or may be as fine (narrow ranging) as a specific mailing address, building, or room. The geographic identifier may be within a finite proximity to specific fixed or mobile landmark. The finite proximity may be of any measurable distance. In an embodiment, the finite distance is within the range of 1 meter to 1,000,000 kilometers from a landmark.

In an embodiment, a transaction requires multiple forms of consent data and one or more of the forms of consent data must be input within a more-fine geography, (such as within a specific building, room or proximity to a landmark) and one or more of the consents may be input within a more-coarse geography, such as outside of the specific building, room or proximity but within a more distant proximity to a landmark. In an embodiment, the more-fine geographic location of the device is measured using special equipment constructed and arranged to detect the device, an emission radiated by the device, and/or a physical structure appended to the device or user. Representative special equipment includes but is not limited to a motion detector, bar code scanner, optical sensor, laser sensor, infrared sensor, ultraviolet sensor, electro-magnetic sensor, radar, sonar, and any combination thereof.

In an embodiment, the determination of the suitable geographic location for inputting one or more forms of consent data is based on historic information. For example, if previously the device logged into the system, or one or more types of consent data were previously input into the system, within a finite distance of a specific fixed or mobile landmark, some or all types of future forms of consent data may not be input from outside of that finite distance unless a form of security waiver is established for inputting that type of consent data.

In an embodiment, the application 10, 12 makes use of one or more elements of the login IP address as a proxy for device identity or geographic location. Typically, an IP address comprises a series of four octets holding a number ranging from 0 to 255, and is separated by dots. According to classical IP address schemes, each octet referred to one of a network address, a host identifier, and various sub-elements thereof. More recently the network address, host identifiers, and sub-elements thereof are often repartitioned for assignment to multiple users by Internet Assigned Numbers Authority (IANA) and regional Internet registries (RIRs).

In an embodiment the application 10, 12 uses some or all of IP address octets, including but not limited to a network address, a host identifier, a sub-element of a network address, a sub-element of a host identifier, and any combination thereof to determine if an input consent is associated with an appropriate device identity and/or an appropriate geographical identity. In an embodiment, the application 10, 12 cross-references the IP address with an RIR and/or an IANA registry to affirm the consent. In an embodiment, the application 10, 12 refers to a list of IP addresses known to be assigned to specific devices or geographic locations and only affirms the consent if the IP address of the logged in device is on the list.

In an embodiment, the system uses an analysis of meta-data to affirm if the geographic location is correct. Meta-data is data associated with information that provides descriptive attributes of data. Three distinct types of meta-data exist: descriptive meta-data, structural meta-data, and administrative meta-data. The system may use all three types for the affirmation.

Descriptive meta-data describes information associated with discovery and identification. It can include elements such as title, abstract, author, and keywords. Structural meta-data is meta-data describing information associated with the containers of data and indicates how compound objects were put together, for example, how pages are ordered to form chapters. It includes the types, versions, relationships and other characteristics of digital materials. Administrative meta-data describes information associated with managing resources, such as when, where, and how it was created, file type, and other technical information, and who can access it.

In an embodiment, the system associates one or more categories of meta-data with specific geographic locations. This may be appropriate when certain forms or combinations of one or more of descriptive, structural, and administrative data may only become embedded in an object when a specific person is in a specific location when the object is created or modified. For example, certain meta-data tags cannot be created without equipment or software only available with systems in certain locations (such as a specific kiosk or office computer). So, during a consent data upload, the meta-data of a record or object involved in the upload, such as a digital version of a contract or form, can be scrutinized to determine if it is associated with an acceptable geographic location and may be rejected if not.

In an embodiment, the meta-data is compared with another geographic indicator such as MAC address or IP address and unless there is adequate consistency between some or all the geographic indicators, the consent will be rejected. Adequacy may be within the range of 0.001% to 100% consistency.

In an embodiment, the system comprises a profile of the user with a specific geographic location associated with that user. The profile may be pre-existing and/or may be instantly generated when a user logs into the system with a device. The system may be configured to only accept consent data associated with the profile when the user logs in to the system within a finite proximity of that geographic location. In an embodiment, meta-data is used to establish that geographic location and/or meta-data is used to affirm that the user is within that geographic location.

In an embodiment, the geographic location must be determined to be acceptable before or after one or more of when the device logged into the system, when an event (such as a meeting with a consultant or an appointment at an office) was scheduled to occur, when another form of consent data was input, when an authentication process has been performed, and any combination thereof.

In an embodiment, subsequent to a validating time period after receiving the consent data, the system makes a subsequent determination of the geographic location of the device. If the subsequent determination indicate that the device is in a geographic location that does not conform to a pre-determined acceptable geographic location, the received consent may be pulled, revoked, reduced in scope or duration, or otherwise invalidated. In an embodiment, the validating time period is a time within the range of 1 second to 1 year.

In an embodiment, the system executes one or more time evaluating applications 11 for determining if the correct time is associated with the input consent data. The application may involve determining which specific kind of consent data was input, at which specific time was the consent data input, and was the input time acceptable for the specific kind of input consent data. If the time evaluating application 11 affirms that the input time was suitable for the kind of input consent data then a record of the consent data is saved 8 for later retrieval as appropriate.

In an embodiment, the input time must be within a time range selected from the group consisting: 0.0001-10,000 hours of a fixed time period, daytime, nighttime, business hours, after hours, no later than 1-12 hours before the end of business hours, no earlier than 1-12 hours after the start of business hours, a time simultaneous to the presence of a specific person in a specific location, and any combination thereof. In an embodiment, more than one type of consent data is input and one, some, or all of the consent data must be input within the time range.

In an embodiment, the time range is a fixed period before or after one or more of when the device logged into the system, when an event (such as a meeting with a consultant or an appointment at an office) was scheduled to occur, when another form of consent data was input, when an authentication process has been performed, and any combination thereof.

In an embodiment, the time that each form of consent data is input into the system is noted according to a timestamp scheme. A timestamp is manner of recording of the time at which an event is recorded by a computer. Timestamps are typically used for logging events or in a sequence of events (SOE), in which case each event in the log or SOE is marked with a timestamp. In an embodiment, the timestamp may be the stored date/time of creation or modification of a file. In an embodiment, the time evaluating application 11 only affirms the consent data if an appropriate time stamp is associated with the input of the consent.

Timestamps typically comprise a unique identifier, or fingerprint, called an SHA Hash. The SHA Hash may be calculated from descriptive, structural, or administrative attributes of the consent data or meta-data thereof. The attributes may include the digital file size of the consent data and various hardware (such as the device) or software involved in its creation. As this process is generally unique because a given customer or device can typically only input one form of consent data at a given time, each timestamp for each form of consent data should be unique. In an embodiment, the time evaluating application 11 compares the SHA Hash of a form of input consent data, to some or all of the SHA Hashes stored in the computer system (both for consent data and for other data within the computer system) and only affirms the consent data if some or all of the consent data's SHA Hash is unique.

Time dependent validations such as timestamps or SHA Hashes may be useful to validate circumstances when another form of chronological corroboration (such as a measurement of another clock or timer independent from the device and from the system) makes it certain that the customer was present when the consent data was input. Similarly, such time dependent validations may be useful to invalidate consent data if it was input at a time known when it was impossible for the customer to have been present. In an embodiment, the system accesses one or more of other forms of information such as schedules, calendars, appointments, or itineraries, which may or may not be present on the device or elsewhere in the system, to establish the time period used to affirm or invalidate input consent data. For example, if the device contains logs regarding the various times and locations that the customer will attend during a day, a validation process may confirm that the location and time in the log matches the time dependent validation.

In at least one embodiment, various received consent data is stored and may be accessed again when the user makes subsequent applications for the same or other transactions. In an embodiment, subsequent to successfully inputting all the consent data, a user and an entity retrieves the consent data and then execute one or more transactions requiring such consent data.

The introduction or updating of consent data is referred to as "pushing" data. In at least one embodiment a user may "pull" data (i.e. remove data) from the computer system 1. This may involve deleting, redacting, setting a time for deletion, or otherwise reducing some or all of the consent data present on the computer system 1.

For example, the consent data may be valid for a set period of time and then expire and require updating. In at least one embodiment, the set period of time is between 1 day and 200 years. In at least one embodiment, after the set period of time has elapsed, the consent data is automatically pulled from the saved data storage site 8. As a result, in an embodiment, if a customer uploads consent data into the system, that consent data may be retrieved for any number of subsequent transactions up until that consent data is pulled. Once pulled however, no transactions requiring that consent data may be performed until new consent data is pushed into the system.

In an embodiment, the pushing of one or more items of consent data or one or more portions of one or more an item of consent data, may be performed at more than one location. Thus, a first consent data push may occur at a first geographic location and a second and/or more subsequent push may occur at a second or more subsequent geographic location. If an attempt is made to make a subsequent push of consent data from a non-suitable location, the subsequent push of consent data is not accepted and at least some or all prior consent data may optionally be pulled. The data to be pulled may be data that was pushed at a particular (same or different to the subsequent or previous) geographic location, and or at a particular time or with a (same or different to the subsequent or previous) particular device. In an embodiment, the particular time is within the range of 1 second to 100 years prior to the prior or subsequent push of consent data.

The identity of a more subsequent push's geographic location may be selected by the user prior to, during, or after one or more previous pushes. As an example, if a previous push includes a consultation, communication, or conversation, the customer may verbally or otherwise explicitly identify one or more selections suitable for a subsequent push's geographic location. The identification may occur during an audio telecommunication linkage between the user's device and a remote computer system.

In an embodiment, an application automatically selects or parses one or more selections suitable for a subsequent push's geographic location. This may be done by selecting from: specific addresses associated with the customer (including but not limited to home address, work address, addresses of one or more close family members or friends, or an address frequently attended by the customer), specific locations associated with a transaction type or account type (including but not limited to specific branch or government offices), specific locations of legal significance (including but not limited to court houses, notary offices, arbitration facilities, legal residences or domiciles), or locations bearing specific pieces of equipment or technology (including but not limited to laboratories, R&D facilities, manufacturing facilities, and commercial or industrial facilities).

Figure 2:
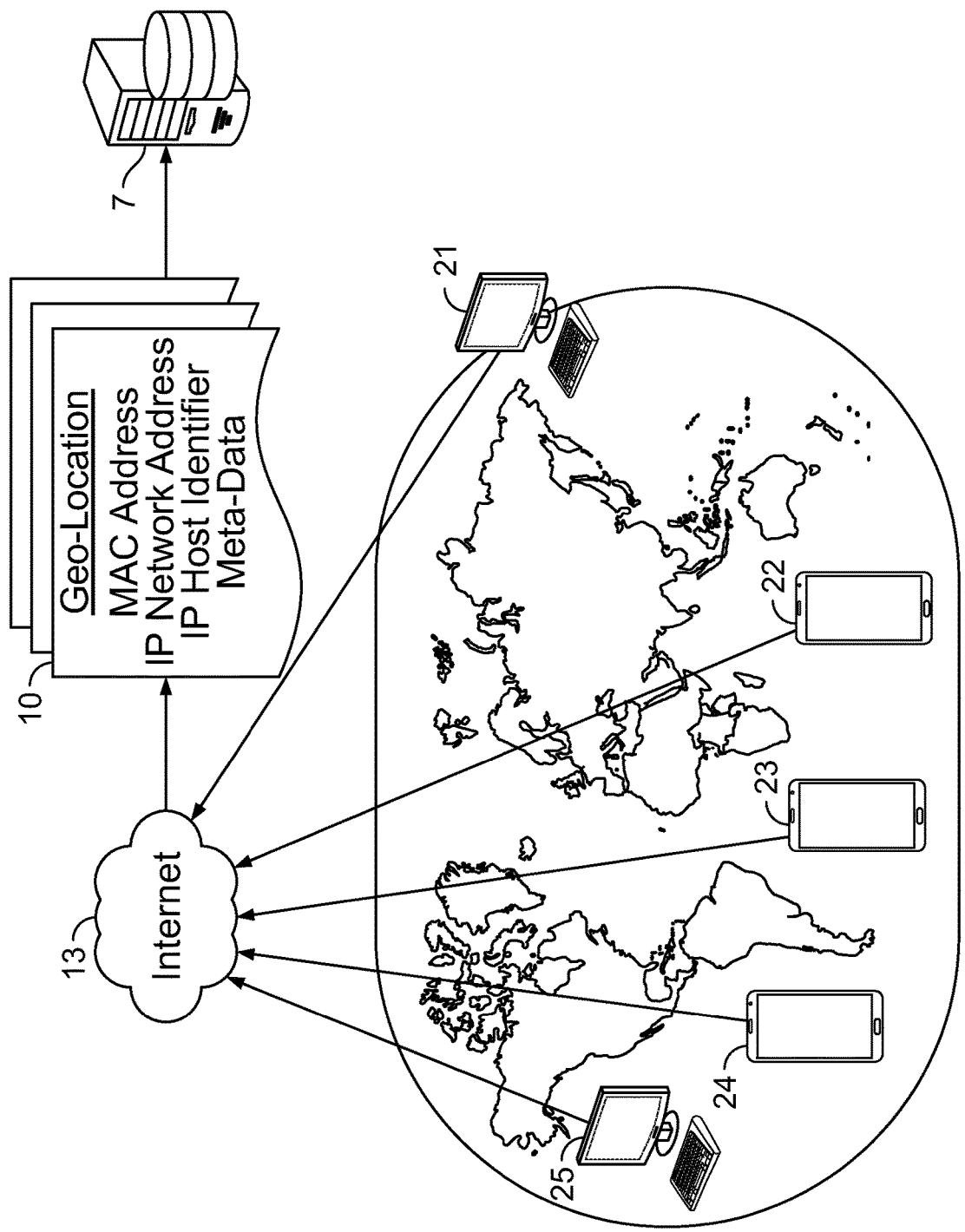
FIG. 2 is a second systems chart illustrating an embodiment of the disclosure utilizing geo-location.

FIG. 2 illustrates an embodiment of a geo-location system for a consent data input and retrieval system. Numerous user devices 21, 22, 23, 24, 25 may each log into the system from numerous locations via the internet 13. The devices log into the system for purposes of submitting consent data and/or for executing a transaction utilizing consent data. In an embodiment, the system prompts each user to indicate their location. Geographic evaluation application 10 utilizes available information to identify the device's location. The available information includes but is not limited to the device's MAC address, IP network address, IP host identifier, meta-data, and any combination thereof. In an embodiment, if the user indicated address and the available information do not match, the consent data input and/or the transaction may not proceed. In an embodiment, if the user indicated address and the available information are not within a finite distance of each other, the consent data input and/or the transaction may not proceed.

Figure 3:
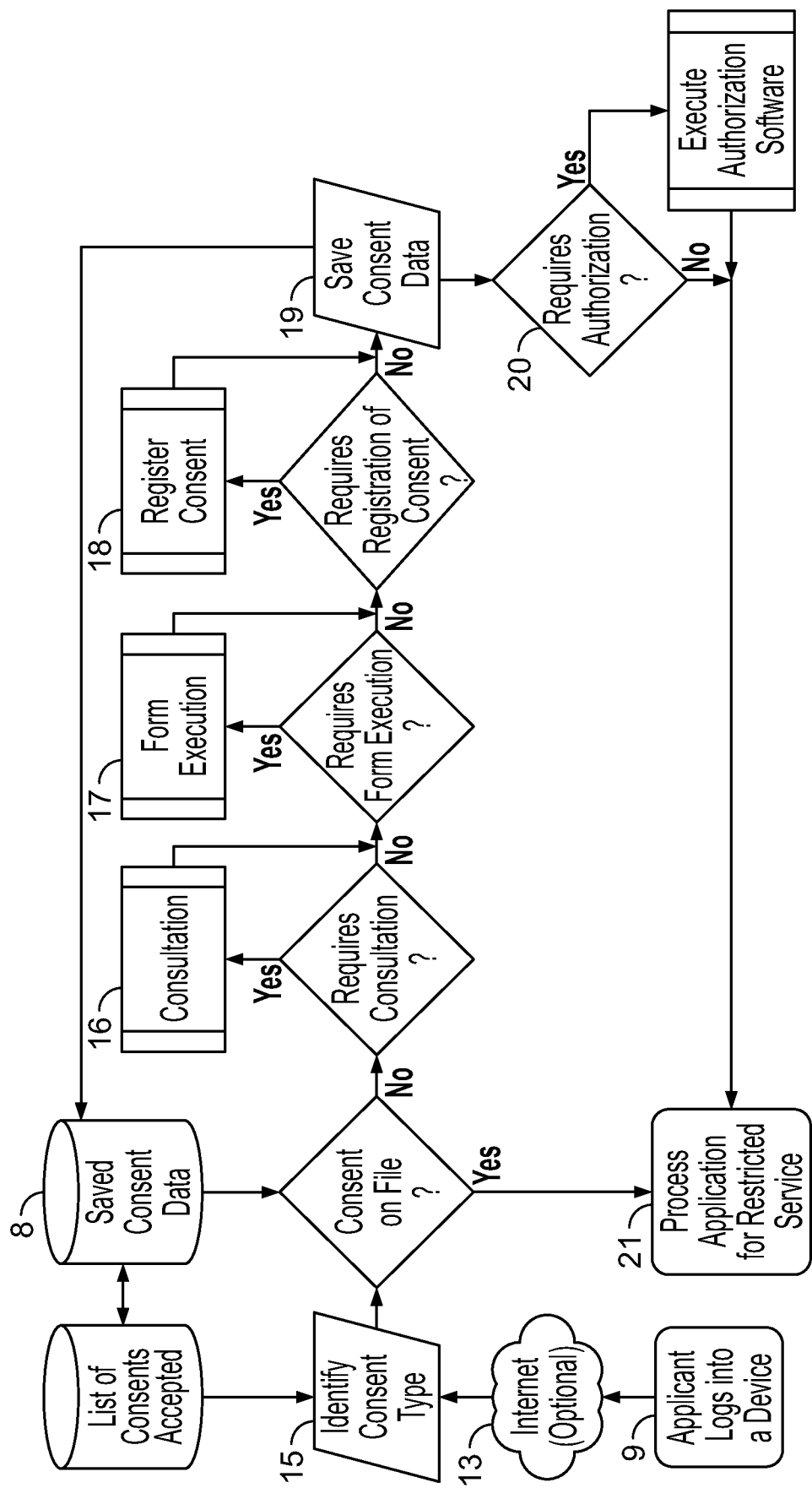
FIG. 3 is a flowchart illustrating a second embodiment of the disclosure utilizing consent information.

FIG. 3 illustrates an embodiment for a consent data input and retrieval system. A user logs a device 9 into the system for the purpose of inputting consent data. The device 9 may access the computer system over the internet 13 or via another connection. The system has a list of transactions to choose from 14 and the user selects one 15. If appropriate for the user and/or the transaction, a consent scheme is run involving one or more applications. The consent scheme will determine if some or all of the required consent data has been previously saved 8. If at least some needed consent data was not previously saved or if it has expired, been pulled, or are otherwise invalid, new consent data is generated. The consent data may include consultation with a credentialed party 16, execution of a form or contract 17, display or provisions of details, terms, or disclosures, and registration of generated consent data with a third party 18. The generated consent data may then be saved for retrieval of relevant for future applications for the same or different transaction 19. After performing the consent scheme, if appropriate for the user and/or the transaction, an authorization/security scheme 20 involving one or more various security applications is run. If the authorization and consent schemes have been successfully completed by the application process, the transaction may then be executed 21. In an embodiment, the authorization scheme may be performed before, during and/or after one, some, or all of the required consent data has been input.

In an embodiment, the consent data may include a record of the execution of a specific form, document, or contract via the user device. The system would provide to the customer, via the device, the form, document, or contract to the customer and would either accept an electronic signature, a scanned copy of a hard copy hand signature, or may require the actual receipt (such as via mail or courier) of a signed hard copy or a notarized hard copy.

In an embodiment, the consent data may be registered with an outside entity upon receiving assent from the user device. This may involve filing items with a recorder's office, a court, a regulatory body, or any other third-party body of relevance to the transaction. Such consent data may be pushed electronically to such an outside entity. The specific outside entity may be determined based on the specific transaction service requested by the customer.

In addition to consent information, the system may include an authentication scheme. This authentication scheme is dependent on the type of transaction at issue and/or some or all of the consent data involved. Item that require authentication or consent or and may require specific forms or degrees of authentication or consent include but are not limited to transactions related to identity, finances, residency, citizenship, employment, credit history, health status, health history, genetics, mental health, predispositions, purchase history, group memberships, affiliations, associations, attendance patterns, travel patterns, communication patterns, location, security clearance, criminal records, number and/or type of transaction requests made, presence on various databases, and any combination thereof. Similarly, different transaction requests may require different data values, degrees of validation, or cross confirmation.

In at least one embodiment, the computer system maintains a default list of the security applications and identifier applications 10, 11, 12 to be executed prior to the device logging into the system. The default list may be maintained by adding to the list security applications more frequently used by the security scheme and consent scheme, and removing from the list security applications less frequently used by the security scheme. In at least one embodiment, the computer system's maintained default lists and the addition or removal therefrom also includes security applications that are associated with the consent scheme.

In at least one embodiment, an authentication scheme is operated to properly enact the running of some security applications prior to inputting consent data and other authentication applications are only activated after user inputting consent data. This may be accomplished by the maintenance of a priority list of applications. An application high enough on the list will be running in the background prior to inputting the consent data. Applications lower down on the list are only activated after consent data has been entered. An application's relative position on the list may increase in response to increases in one or more of: frequency of the application's use in prior consent inputs, time required to complete activation of the application, magnitude of resource investments required for activation of the application, anticipation of requests requiring that particular application, compatibility problems with other applications due to sequence of activations, and any combination thereof. System resources availability may determine how large and how many of the applications on the list may be in operation prior to a user request.

In at least one embodiment, the computer system activates an authentication scheme to assess whether to allow for the input of the consent data or not. In an embodiment, the transaction is to be performed using an identified account such as a bank account, line of credit and the like. The authentication scheme determines if the purported user has authority to access the identified account. If not, the authentication scheme rejects any request to input consent data. If so authorized, a next step would be to determine if both the account and the user are authorized to perform a selected transaction on the account. This may not be a binary matter as times, frequencies, and amounts may affect the degree of authority. If the purported, user under current circumstances, is authorized to conduct the transaction on the account, the authentication scheme then performs a targeted security check using specific security applications.

In at least one embodiment, a pre-established security value determines the scrutiny needed to input consent data. Different authentication applications may involve different degrees of reliability and validation. The more authentication applications used or the use of more reliable authentication applications result in a higher probability of accurate determination of the probity of authorizing a transaction. In addition, different security applications may be more or less suitable for different circumstances. For example, a scanner validating a picture ID may be highly probative if the user is from a location associated with lower incidences of ID counterfeiting and less probative if the user is from a location associated with higher incidences of ID counterfeiting. The authentication scheme may be tailored to take into account both gross veracity of each authentication application in general, and fine focusing of specific applications especially valuable to specific users, accounts, transactions, or locations.

For example, if the transaction is a home loan, a valid driver's license might simply be a general identification validation. For an auto loan however, this general information may not be sufficient and a finer category of information may be required. An example of a finer category of information in this case may be items such as motor vehicle department driving records history may be appropriate for the authentication scheme.

The authentication applications may utilize software and/or hardware selected from the group consisting of: biometric validation of unique identifiers such as a fingerprint recognition program, voice recognition program, iris recognition program, DNA (deoxyribonucleic acid) recognition program, heart rate reader, blood-oxygen reader, Mill (magnetic resonance imager), biomarker scanners, and facial recognition program. The applications may involve a document recognition program, personal data confirmation, or a camera image being compared to a stored value. The software may utilize such features as a distributed database blockchain data confirmation, risk assessment program, behavior prediction program, bar code scanner, optical scanner, and token identification scanner, magnetic scanner, fax receiver, text reader, OCR (optical character reader), card reader, x-ray scanner, and transponder reader. Also, any combination of any item of these groups may also be utilized.

The authentication applications receive a source of input and output generated data. The generated data either increases or decreases the resulting generated security value. The generated data may be selected from the group consisting of validation or invalidation of: biometric data, pre-authorized device identity, consistency with selected transactions, information in a regulatory agency, information in picture ID, consistency with asset value threshold, consistency with number of transaction thresholds, consistency with number of consent value change thresholds, consistency between user and account authority, with and any combination thereof.

Subsequent to processing the authentication scheme, the computer system may deactivate some active applications and activate some deactivated applications to assume the optimal initial resource using resting state for processing future request.

The account associated with the transaction may be any data item in a computer system containing a record capable of being the object of a commercial transaction. This includes but is not limited to bank back office systems, vendor systems, bank accounts, client facing systems, order entry systems, inventory systems, supply chain systems, customer rewards systems, point of sale systems, and bank payment systems. Different account types may have different consent requirements due to the customer or entity assigning different priorities to either security of funds or ease of accessing funds.

In an embodiment, when the device logs into the computer system, the user is previously unknown to the computer system or to the entity. This may occur for example, when a new user, without a prior relationship with the entity, wishes to set up an account in the expectation of executing a transaction from the account (for example setting up a bank account then using the bank account to purchase a house).

In at least one embodiment, the authentication scheme may further comprise the involvement of a human being. A human may be needed to validate the identity or location of a user or otherwise provide input to the process before a security consent value may be changed. The human may enter data into the system indicating that that they met a person, that the person they met matched a validation item such as an ID, fingerprint, biometric test, voice print, etc. Alternatively, the human role may be to enter data indicating something is wrong with the authentication process. In an embodiment, the authentication process includes an application which waits for a set period of time for human input information indicating a rejection of the authentication process, and if not received by the period of time, and if otherwise approved by the authentication process, approves the authentication process.

Figure 4:
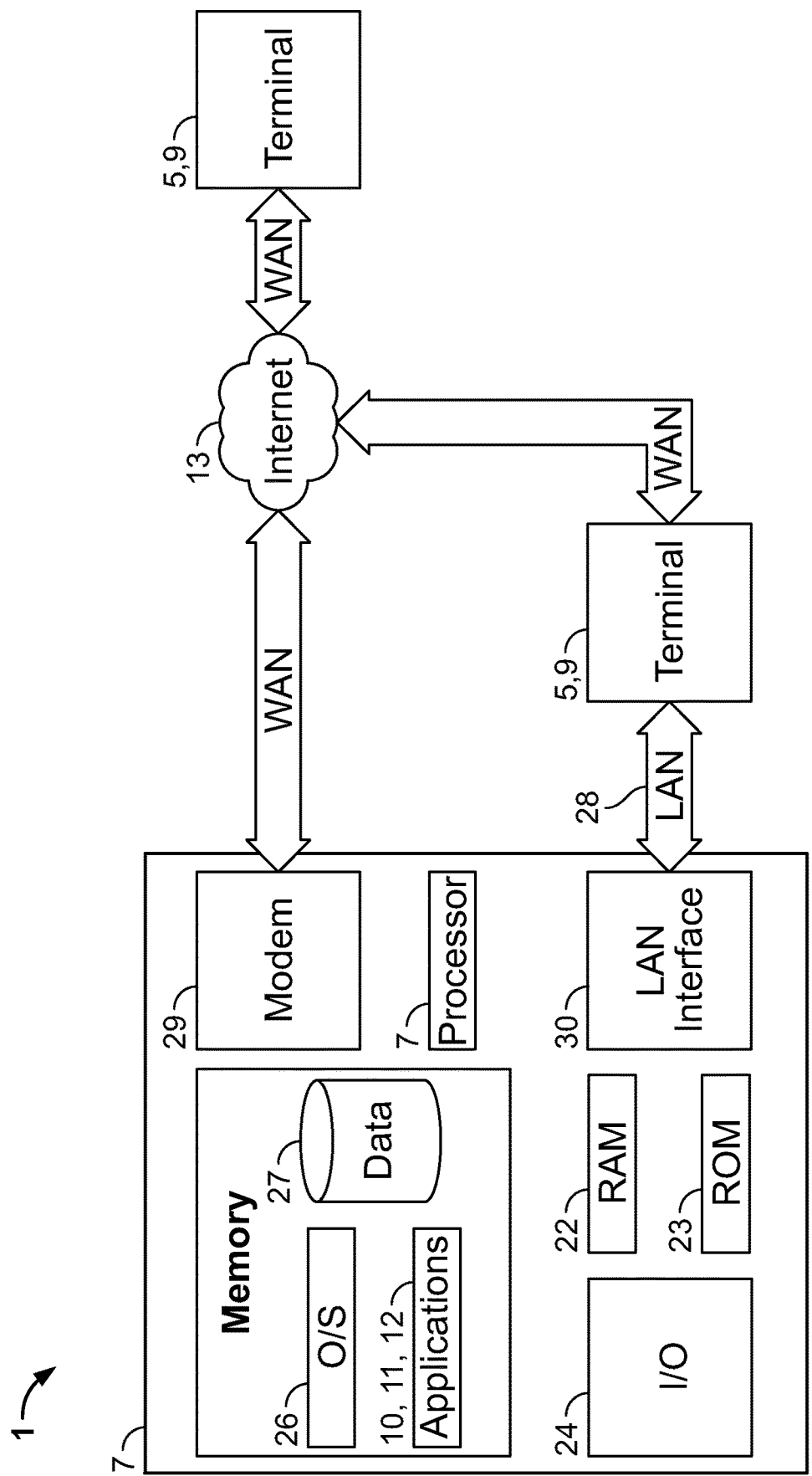
FIG. 4 is a second systems chart illustrating a third embodiment of the disclosure utilizing consent information.

As illustrated in FIG. 4, the computer system 1 may have a processor 7 for controlling the operation of associated components, and may include RAM 22, ROM 23, input/output modules 24 and a memory 25. The processor 7 may also execute all software running on the computer—e.g., the operating system, consent applications 10, 11, 12, and authorization applications. Other components commonly used for computers such as EEPROM or Flash memory or any other suitable components may also be part of the computer system.

The memory of the computer system may be comprised of any suitable permanent storage technology—e.g., a hard drive or cloud based storage. The memory stores software, including the operating system of any application(s), along with any data 27 needed for the operation of the computer system. Alternatively, some or all of computer executable instructions may be embodied in hardware or firmware. The computer executes the instructions embodied by the software to perform various functions.

The computer system may be connected to other computer systems via a local area network (LAN) 28, a wide area network (WAN) 29, or other network arrangement. The system may operate in a networked environment supporting connections to one or more remote computers, such as terminals 5, 9, personal computers, or servers that include many or all of the elements described above relative to system. The network may be interconnected via adaptors, modems 29, interfaces 30 or other communication medium including the internet 13.

It will be appreciated that any known network connections or other means of establishing a communications link between the computers may be used. The existence of any of various well-known protocols such as TCP/IP, Ethernet, FTP, HTTP and the like is presumed, and the system can be operated in a client-server configuration to permit a user to retrieve applications such as web pages from a web-based server. Any of various conventional web browsers can be used to display and manipulate data on web pages.

The computer system may also include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; logical processing device, which may compute data structural information, structural parameters of the directed graph and/or language model and machine-readable memory. Components of the computer system may be coupled together by a system bus or other interconnections and may be present on one or more circuit boards. In some embodiments, the components may be integrated into a single chip. The chip may be silicon-based.

Figure 5:
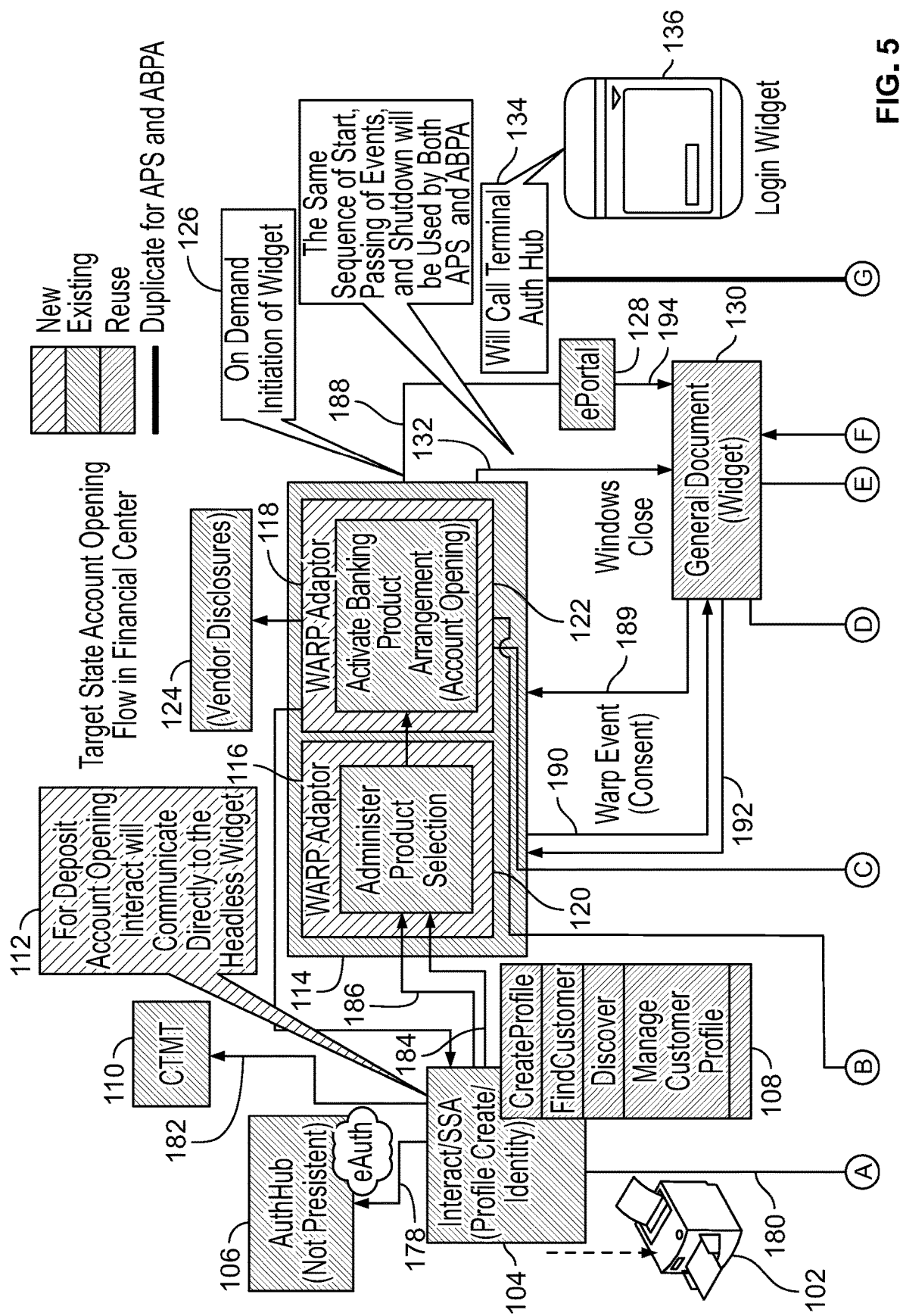
FIG. 5 is an illustrative diagram in accordance with principles of the invention.
Figure 6:
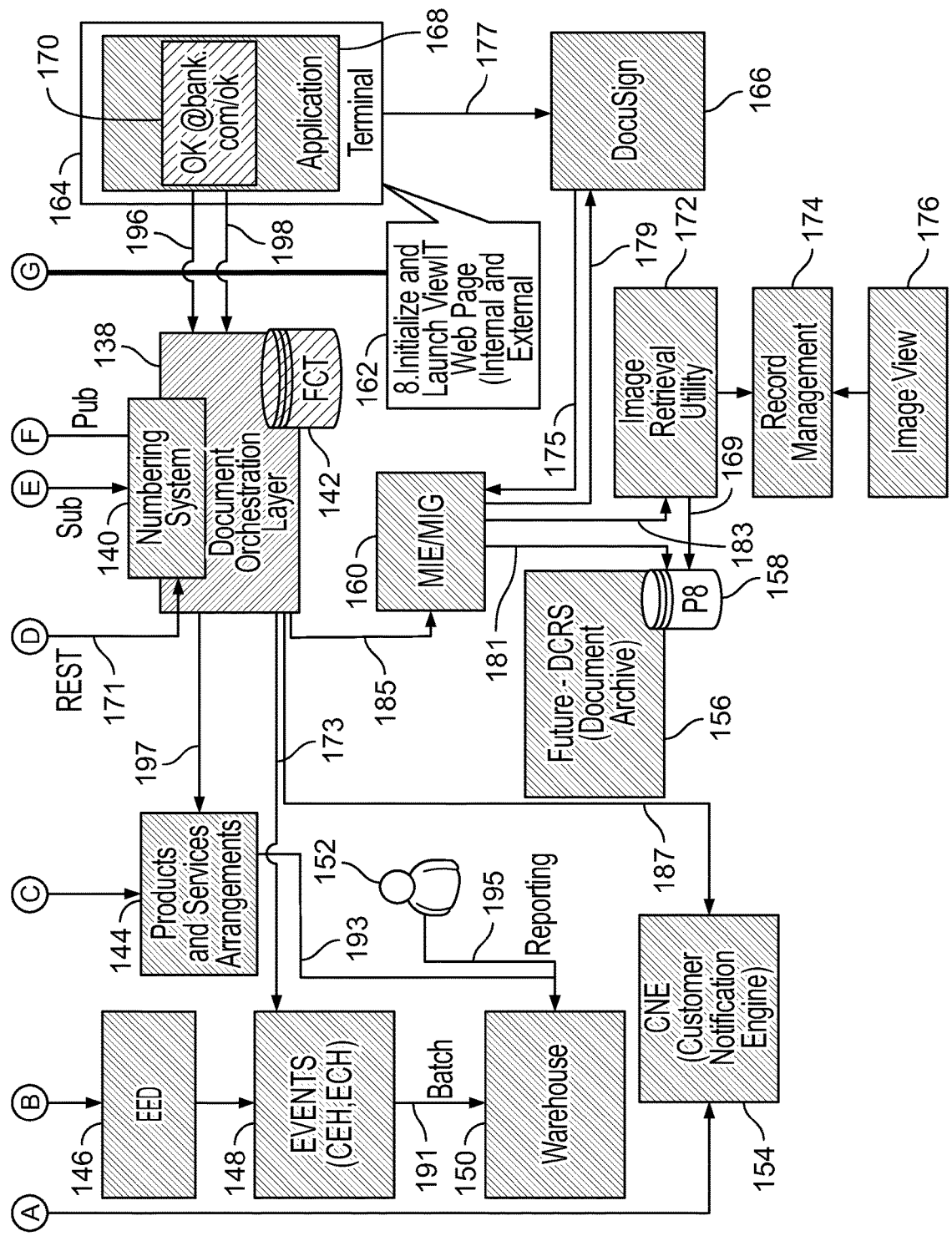
FIG. 6 is an illustrative diagram in accordance with principles of the invention.

FIGS. 5 and 6 show a target state account opening flow in a transaction performed by a financial center. A target state, for the purposes of this application, may be an ideal process flow.

At interaction 104, an interaction between an entity and a customer is initiated. Interaction 104 interaction may be initiated by the customer. Interaction 104 may be initiated by the entity. Interaction 104 may include completing a sales and service application ("SSA"). Interaction 104 may include creation of a profile for the customer. The profile may include information relating to the customer, such as name, address and phone number. The profile may also include previously entered consent data associated with the customer. The profile may include any accounts associated with the customer. The profile may also include biometric information relating to the customer. The profile may also include geo-fencing, chronological fencing, and/or device fencing criteria associated with the customer. The biometric, geo-fencing, chronological fencing, and/or device fencing information may be used in an authentication process to authenticate a customer during the process flow. Interaction 104 may include identification of a profile for the customer. Interaction 104 may include executing one or more of operations 108.

Operations 108 may include methods steps which may be performed to initiate an interaction and/or subsequent to initiation of the interaction. Operations 108 may include tasks such as creating a profile, finding a customer, discover and manage a customer portal. During interaction 104, method steps may include communicating with physical hardware, such as printer 102.

Communication line 178 may link interaction 104 with authorization hub 106. Communication 178 may be conducted via Web Application Re-use Platform ("WARP") events. Authentication hub 106 may authenticate the customer. Authentication hub 178 may operate in its own domain. Authentication hub 178 may provide an added layer of functionality by performing autonomously.

Using communication line 180, in the case of a digital authentication option, the customer associated with the login may be notified of the login attempt using customer notification engine ("CNE") 154.

Communication line 182 links Module Channel Technology Mid-Tier ("CTMT") 110 and interaction 104. CTMT 110 may generate one or more deposit forms. For example, CTMT 110 may generate a direct deposit form for a customer.

Communication line 184 links interaction 104 and administer product selection ("APS") 120. Communication line 184 may transmit information generated during interaction 104 and thereby prime APS 120. Priming APS 120 may include utilizing data generated during interaction 104 to pre-populate APS 120. The data may include authentication data. The authentication data may have been received during interaction 104 from authentication hub 106 via communication line 178. In order to prime APS 120 a subroutine may be called and executed.

Communication line 186 may activate a banking product arrangement ("ABPA") uniform resource locator ("URL") at ABPA 122. Interaction 104 may trigger launch of the ABPA URL in a separate window at ABPA 122.

Communication line 188 may initiate generate document widget 130. The document widget may generate consent data and/or may retrieve previously saved consent data. Generate document widget 130 may be generated two or more times. For example, a first instance of widget 130 may be generated for APS 120. A second instance of widget 130 may be generated for ABPA 122. The document generation may be performed at a portal, such as electronic portal, shown at 128. Callout 126 shows that widget 130 may be generated on-demand. Callout 112 shows that, when interaction 104 includes a deposit account opening, interaction 104 may include transmitting information directly to widget 130.

A general document or other form of consent data generated by widget 130, may be transmitted to the customer via communication link 194 or communication link 190. The document may be transmitted via one or more WARP events. Communication link 192 shows that ABPA 122 may be informed of which document is needed from the customer. ABPA 122 may communicate directly with vendor disclosures 124.

As shown at 162, the customer may initialize and launch a webpage, including but not limited to a ViewIT webpage. The webpage may be an internal webpage with respect to the hosting entity. The webpage may be an external webpage with respect to the hosting entity. In some embodiments, the initialized webpage may be webpage 170. Webpage 170 may be resident in application 168 at terminal 164. Terminal 164 may be a virtual terminal, such as a mobile device terminal. Terminal 164 may be a physical terminal, such as a banking center, automated teller machine ("ATM") or automated teller assist ("ATA") or other such kiosk.

Application 168 may poll document orchestration layer 138 for new documents, using communication 196. The documents may include account application documents, consent data, geo-fencing, chronological fencing, and/or device fencing information, release documents and any other suitable documents. The documents may include information and/or requirements that may require consent and/or agreement from a customer. Document orchestration layer 138 may transmit, or display a document, which may be included in database 142, to the customer, using application 168. Application 168 may be running on a mobile device of the customer. The customer may transmit consent to document displayed within application 168 using communication line 198. The customer may also transmit the document from application 168 to document orchestration layer 138. Document orchestration layer 138 may store the consent and/or the document associated with the consent. The storage may be in database 142.

Document orchestration layer 138 may communicate with general document widget 130 via numbering system 140. Numbering system 140 may number each document. Numbering each document may enable tracking, recording and retrieval of each document.

Document orchestration layer 138 may update products and services arrangements ("PSA") 144 available to the customer based on the consent and/or the document associated with the consent. PSA 144 may be accessed through application 168. The recordation of a consent and associated document may utilize representational state transfer ("REST") services, as shown at 171. Documentation orchestration layer 138 may log customer event hub/enterprise customer event hub ("CEH/ECH") 148 regarding the transmitted consent and/or consented document, as shown at 173. The information associated with CEH/ECH 148 may be transmitted to data warehouse 150 in batch files, as shown at 191. PSA 144 and entity 152 may also transmit reporting information to data warehouse 150, using communications 195 and 193, respectively.

CEH/ECH events 148 may receive vendor disclosure information from enterprise event data store ("EED") 146.

General document widget 130 may transmit a WARP event, including the consent, to WARP communications collaboration center 114 via communication line 189. The warp event may be directed to the calling application, which may be APS 120 or ABPA 122 using WARP adaptors 116 or 118, respectively. Document orchestration layer 138 may transmit a notification to customer notification entity 154, via communication 187. The notification may notify the customer, via e-mail, text or other suitable communication mechanism, regarding the WARP event and its success or failure. Windows close communication 132 may show that the same sequence of start, passing of events, and shutdown may be used by both APS and ABPA.

Login Widget 136 may be associated with terminal 164. Login Widget 136 may securely call terminal 164, as shown at 134.

Document orchestration layer 138 may create an environment or get a URL using communication 185 with Message Integration Engine/Mortgage Integration Gateway (MIE/MIG) 160. MIE/MIG 160 may direct Image retrieval utility 172 (which may be used for bulk check statement image retrieval utility supporting various delivery channels and products) to generate a consent document via communication 183. MIE/MIG 160 may transmit metadata to database 158, included in document archive 156, via metadata feed 181. MIE/MIG 160 may transmit metadata to docusign 166 via metadata feed 179. The customer may electronically sign the consent document at terminal 164. The electronic consent data may be transmitted to docusign 166 via communication 177. DocuSign 166 may transmit the consent to MIE/MIG 160 via communication 175. Communication 175 may determine the completion of the consent document signing event. Image retrieval utility 172 may also transmit the completion of the consent to database 158, via communication 169.

Image retrieval utility 172 and image view 176 may transmit the consent data as a document to record management 174.

While this invention may be embodied in many different forms, there are described in detail herein specific preferred embodiments of the invention. The present disclosure is an exemplification of the principles of the invention and is not intended to limit the invention to the particular embodiments illustrated. All patents mentioned herein or mentioned, are incorporated by reference in their entirety. Furthermore, the invention encompasses any possible combination of some or all of the various embodiments described herein and/or incorporated herein. In addition, the invention encompasses any possible combination that also specifically excludes any one or some of the various embodiments described herein and/or incorporated herein.

The above disclosure is intended to be illustrative and not exhaustive. This description will suggest, many variations and alternatives to one of ordinary skill in this art. All the alternatives and variations are intended to be included within the scope of the claims where the term "comprising" means "including, but not limited to". Those familiar with the art may recognize other equivalents to the specific embodiments described herein which equivalents are also intended to be encompassed by the claims.

Those skilled in the art may recognize other equivalents to the specific embodiment described herein which equivalents are intended to be encompassed by the claims attached hereto.

What is claimed is:

1. A method of improving the performance of a computer system, the method comprising the steps of:

reactivating, at a scheduled time, dormant system resources required to execute a plurality of system applications on a default list, the default list identifying a group of default system applications, the resources comprising electricity, processing power, and auxiliary systems;

creating, and no less than a minute later terminating, an audio telecommunication linkage with a remote device when the device is located at a first geographic location;

during the telecommunication linkage, a second geographic location is identified via audio transmission, the second geographic location different from the first geographic location;

detecting transporting of the device to the second geographic location after the termination of the telecommunication linkage;

at the second location, processing a signal received from the device, the signal comprising an identity of an item of consent data, a transaction identity, a device identity, an indicator that the device is located at the second geographic location, a time period, and identity of the device user;

based on the second location, activating a consent scheme comprising:

retrieving a list identifying a group of system applications associated with the identified item of consent data;

deactivating active system resources of system applications absent from the list;

reactivating dormant system resources required to activate a first collection of dormant system applications on the list, the first collection of system applications verifying that the device is in fact at the second geographic location and that the second geographic location matches a predetermined value associated with the identified item of consent data;

reactivating dormant system resources required to activate a second collection of dormant system applications on the list, the second collection of system applications verifying that the time period matches a predetermined value associated with the identified item of consent data; and reactivating dormant system resources required to activate a third collection of dormant system applications on the list, the third collection of system applications verifying that the device identify matches a predetermined value associated with the identified item of consent data;

when all of the second geographic location, time period, and device identity match their respective predetermined values, changing the operation of the device to optimize the preparation of the identified item of consent data, the change in operation comprising: altering the luminosity of a screen on the device, altering the size of text characters displayed on the screen of the device, and terminating communication between the device and any computer system not executing the consent scheme;

creating the identified item of consent data and retrieving the item of consent data from the device; and when, over the course of a 30-day period, a default application is deactivated by the consent scheme more times than a non-default application is activated by the consent scheme, replacing the default application with the non-default application in the list.

2. The method of claim 1 wherein the item of consent data is selected from the group consisting of a digital document, an electronic signature, a scanned copy of a paper document, a scanned copy of a hand signature, a digital affirmation, a text bearing digital file, an audio recording of a conversation, a video recording of a conversation, and any combination thereof, and comprises meta-data and an SHA Hash.

3. The method of claim 1 further comprising verifying the device's identity by comparing its MAC address to items selected from the group consisting of a list of approved MAC addresses, a list of disapproved MAC addresses, and any combination thereof.

4. The method of claim 1 wherein the signal is transmitted from the device via a multi layered network comprising multiple MAC addresses and verifying the device's geographic location by comparing all the involved MAC addresses to items selected from the group consisting of a list of approved MAC addresses, a list of disapproved MAC addresses, and any combination thereof.

5. The method of claim 1 further comprising verifying the device's geographic location by comparing its IP address to a geographic location associated with the IP addresses.

6. The method of claim 1 further comprising verifying the device's geographic location by analyzing meta-data embedded within the signal or embedded within the item of consent data.

7. The method of claim 1 wherein the device is logged onto the remote computer system via an ISP server over the internet and verifying the device's geographic location by identifying IP addresses associated with the ISP server.

8. The method of claim 1 wherein the device is logged onto the remote computer system via an integrated component of the remote computer system and verifying the device's geographic location by identifying a known physical location of the integrated component.

9. The method of claim 1 wherein the system applications are selected from the group consisting of: geography confirming software, time retrieval software, time stamping software, fingerprint recognition program, voice recognition program, biometric recognition program, document recognition program, distributed database blockchain data confirmation, token identification scanner, card reader and any combination thereof.

10. The method of claim 1 further comprising:
creating a timestamp associated with the consent data;
comparing the timestamp to other timestamps logged by the device; and
rejecting the consent data when any of the other timestamps matches the timestamp associated with the consent data.

11. The method of claim 1 further comprising performing an authorization scheme configured to confirm that the transaction identify is associated with the device.

12. The method of claim 11 further comprising performing the authorization scheme concurrently with performing the consent scheme.

13. The method of claim 11 wherein the authorization scheme is activated before the consent scheme is activated.

* * * * *